United States Patent
Dai et al.

(10) Patent No.: US 11,108,484 B1
(45) Date of Patent: Aug. 31, 2021

(54) SYNCHRONIZATION SIGNAL DETECTION FOR HIGH-SPEED ETHERNET CONNECTIONS

(71) Applicant: Marvell Asia Pte, Ltd. (Registration No. 199702379M), Singapore (SG)

(72) Inventors: Shaoan Dai, San Jose, CA (US); Xing Wu, Palo Alto, CA (US); Zhenzhong Gu, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/846,584

(22) Filed: Apr. 13, 2020

Related U.S. Application Data

(60) Provisional application No. 62/837,100, filed on Apr. 22, 2019.

(51) Int. Cl.
| | |
|---|---|
| *H04J 3/06* | (2006.01) |
| *H04J 3/14* | (2006.01) |
| *H04J 3/16* | (2006.01) |

(52) U.S. Cl.
CPC .......... *H04J 3/0658* (2013.01); *H04J 3/0614* (2013.01); *H04J 3/0697* (2013.01); *H04J 3/14* (2013.01); *H04J 3/1617* (2013.01); *H04J 2203/0085* (2013.01)

(58) Field of Classification Search
CPC ... H04W 56/00; H04W 56/001; H04J 3/0658; H04J 3/0667; H04J 3/0682; H04J 3/0691; H04J 3/06; H04J 3/14; H04J 3/0614; H04J 3/1617; H04J 3/06917; H04J 2203/0085

USPC ......................................................... 370/503
See application file for complete search history.

(56) References Cited

U.S. PATENT DOCUMENTS

| | | | | |
|---|---|---|---|---|
| 6,430,241 | B1 * | 8/2002 | Rupprecht | H04J 3/0682 370/519 |
| 6,470,458 | B1 * | 10/2002 | Dreps | G06F 1/10 713/1 |
| 2002/0114354 | A1 * | 8/2002 | Sinha | H04J 3/0658 370/503 |
| 2004/0165480 | A1 * | 8/2004 | Shemesh | G04G 5/00 368/46 |
| 2014/0269854 | A1 * | 9/2014 | Wong | G06F 13/4291 375/219 |
| 2016/0344536 | A1 * | 11/2016 | Kumar | G06F 13/40 |
| 2017/0150464 | A1 * | 5/2017 | Kazehaya | H04B 7/269 |

* cited by examiner

*Primary Examiner* — Robert J Lopata

(57) ABSTRACT

A method of synchronizing master and slave nodes on a high-speed Ethernet connection includes sending a first plurality of synchronization pulse units from the master, receiving at the master a second plurality of synchronization pulse units sent by the slave in response to receipt of the first plurality of synchronization pulse units, monitoring at the master for receipt of a first synchronization pulse unit from the second plurality, having a predetermined characteristic, monitoring at the master for receipt of at least one further synchronization pulse unit, from the second plurality, having the predetermined characteristic, and recognizing receipt of the second plurality upon receipt of the first and at least one further synchronization pulse unit having the predetermined characteristic, where the first synchronization pulse unit and the at least one further synchronization pulse unit meet either a first temporal spacing condition or an integer multiple of the first temporal spacing condition.

20 Claims, 4 Drawing Sheets

SYNCHRONIZATION SIGNAL DETECTION FOR HIGH-SPEED ETHERNET CONNECTIONS

CROSS REFERENCE TO RELATED APPLICATION

This disclosure claims the benefit of commonly-assigned U.S. Provisional Patent Application No. 62/837,100, filed Apr. 22, 2019, which is hereby incorporated by reference herein in its entirety.

FIELD OF USE

This disclosure relates to detection of synchronization signals on a high-speed Ethernet connection. More particularly, this disclosure relates to a method and apparatus for reliable detection of synchronization signals on a high-speed Ethernet connection in a noisy environment.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In order to synchronize the connection between a master node and a slave node on a high-speed Ethernet connection, the master node and the slave node exchange "send-S" signals. According to the IEEE 802.3 bp standard, a master node sends a send-S signal in the form of three repeatable pseudorandom bit sequences (PRBSs), each having a duration of 255 unit intervals (1 UI=4/3 of a nanosecond) spread over 1.02 μs, followed by a 4 μs quiet period. That 5.02 μs pattern is repeated continually until the master node receives an answering send-S signal from the slave node. The answering slave send-S signal is one set of three 255 UI PRBSs spread over 1.02 μs. However, in noisy environments, it may be difficult to detect the single 1 μs slave send-S signal, which would result in a delay in establishing a link between the master node and the slave node.

SUMMARY

In accordance with implementations of the subject matter of this disclosure, a method of synchronizing a master node and a slave node on a high-speed Ethernet connection includes sending a first plurality of synchronization pulse units from the master node on the high-speed Ethernet connection, receiving at the master node a second plurality of synchronization pulse units that are sent by the slave node on the high-speed Ethernet connection in response to receipt at the slave node of at least one synchronization pulse unit from the first plurality of synchronization pulse units, monitoring at the master node for receipt of a first synchronization pulse unit, from the second plurality of synchronization pulse units, having a predetermined characteristic, monitoring at the master node for receipt of at least one further synchronization pulse unit, from the second plurality of synchronization pulse units, having the predetermined characteristic, and recognizing receipt of the second plurality of synchronization pulse units upon receipt of the first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition.

In a first implementation of such a method, the monitoring at the master node for receipt of the first synchronization pulse unit, from the second plurality of synchronization pulse units, having the predetermined characteristic may include monitoring at the master node for receipt of the first synchronization pulse unit, from the second plurality of synchronization pulse units, having a first amplitude above a predetermined threshold, the monitoring at the master node for receipt of the at least one further synchronization pulse unit, from the second plurality of synchronization pulse units, having the predetermined characteristic may include monitoring at the master node for receipt of the at least one further synchronization pulse unit, from the second plurality of synchronization pulse units, having a second amplitude above the predetermined threshold, and the recognizing receipt of the second plurality of synchronization pulse units upon receipt of first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition may include recognizing receipt of the second plurality of synchronization pulse units when each of the first synchronization pulse unit and the at least one further synchronization pulse unit is separated in time from a temporally adjacent one of the first synchronization pulse unit and the at least one further synchronization pulse unit by a first predetermined time interval.

In that first implementation, the recognizing receipt of the second plurality of synchronization pulse units upon receipt of first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition may further include also recognizing receipt of the second plurality of synchronization pulse units when, on failure of one of the at least one further synchronization pulse unit to be recognized at the first predetermined time interval, another one of the at least one further synchronization pulse unit is detected at a multiple of the first predetermined time interval from the first synchronization pulse unit.

That first implementation may further include selecting the predetermined threshold in advance.

That first implementation may further include selecting the first predetermined time interval in advance.

That first implementation may further include setting a temporal tolerance for the first predetermined time interval.

In that first implementation, the recognizing may include monitoring during a second predetermined time interval, shorter than the first predetermined time interval, for occurrence of at least one candidate synchronization pulse unit, and on expiration of the second predetermined time interval declaring one of the at least one candidate synchronization pulse unit having a maximum amplitude to be the first synchronization pulse unit.

In that first implementation, the recognizing may include monitoring for occurrence of candidate synchronization pulse units, and for each respective candidate synchronization pulse unit detected, monitoring for occurrence of the further synchronization pulse unit at a respective elapsing of the first predetermined time interval following the respective candidate synchronization pulse unit.

In a second implementation of such a method, the sending a first plurality of synchronization pulse units may include sending a first plurality of predetermined synchronization pulse sequences, and the sending a second plurality of synchronization pulse units may include sending a second plurality of predetermined synchronization pulse sequences, and the method may further include filtering the first plurality of predetermined synchronization pulse sequences to derive a first plurality of synchronization pulses, and filtering the second plurality of predetermined synchronization pulse sequences to derive a second plurality of synchronization pulses.

In a third implementation of such a method, the sending a first plurality of synchronization pulse units from the master node may include separating each synchronization pulse unit in the first plurality of synchronization pulse units from each temporally adjacent synchronization pulse unit in the first plurality of synchronization pulse units by a first temporal separation interval, and the receiving at the master node a second plurality of synchronization pulse units that are sent by the slave node on the high-speed Ethernet connection in response to receipt at the slave node of at least one synchronization pulse unit from the first plurality of synchronization pulse units may include receiving the second plurality of synchronization pulse units wherein each synchronization pulse unit in the second plurality of synchronization pulse units is separated from each temporally adjacent synchronization pulse unit in the second plurality of synchronization pulse units by a second temporal separation interval different from the first temporal separation interval.

In accordance with implementations of the subject matter of this disclosure, apparatus for synchronizing a master node and a slave node on a high-speed Ethernet connection includes master transceiver circuitry configured to send a first plurality of synchronization pulse units from the master node, and receive a second plurality of synchronization pulse units that are sent by slave transceiver circuitry in the slave node in response to receipt at the slave node of at least one synchronization pulse unit from the first plurality of synchronization pulse units, monitoring circuitry at the master node configured to monitor for receipt of a first synchronization pulse unit, from the second plurality of synchronization pulse units, having a predetermined characteristic, and to monitor for receipt of at least one further synchronization pulse unit, from the second plurality of synchronization pulse units, having the predetermined characteristic, and controller circuitry configured to recognize receipt of the second plurality of synchronization pulse units upon receipt of first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition.

In a first implementation of such apparatus, the monitoring circuitry may be configured to monitor for receipt of the first synchronization pulse unit, from the second plurality of synchronization pulse units by monitoring for a first amplitude above a predetermined threshold, the monitoring circuitry is configured to monitor for receipt of the at least one further synchronization pulse unit, from the second plurality of synchronization pulse units by monitoring for a second amplitude above the predetermined threshold; and the controller circuitry is configured to recognize receipt of the second plurality of synchronization pulse units when each of the first synchronization pulse unit and the at least one further synchronization pulse unit is separated in time from a temporally adjacent one of the first synchronization pulse unit and the at least one further synchronization pulse unit by a first predetermined time interval.

In that first implementation, the controller circuitry may be configured to also recognize receipt of the second plurality of synchronization pulse units when, on failure to recognize one of the at least one further synchronization pulse unit at the first predetermined time interval, another one of the at least one further synchronization pulse unit is detected at a multiple of the first predetermined time interval from the first synchronization pulse unit.

In that first implementation, the monitoring circuitry may be configurable to select the predetermined threshold.

In that first implementation, the controller circuitry may be configurable to select the first predetermined time interval.

In that first implementation, the controller circuitry may be configurable to select a temporal tolerance for the first predetermined time interval.

In that first implementation, the controller circuitry may be configured to, on detecting a first candidate synchronization pulse unit, monitor during a second predetermined time interval, shorter than the first predetermined time interval, for occurrence of a second candidate synchronization pulse unit, and, on expiration of the second predetermined time interval, declare one of the at least one candidate synchronization pulse unit having a maximum amplitude to be the first synchronization pulse unit.

In that first implementation, the controller circuitry may be configured to monitor for occurrence of candidate synchronization pulse units, and for each respective candidate synchronization pulse unit detected, monitor for occurrence of the further synchronization pulse unit at a respective elapsing of the first predetermined time interval following the respective candidate synchronization pulse unit.

In a second implementation of such apparatus, the master transceiver circuitry may be configured to send a first plurality of synchronization pulse sequences as the first plurality of synchronization pulse units, the slave transceiver circuitry may be configured to send a second plurality of synchronization pulse sequences as the second plurality of predetermined synchronization pulse units, and the master transceiver circuitry further comprises a filter configured to filter the first plurality of predetermined synchronization pulse sequences to derive a first plurality of synchronization pulses, and filter the second plurality of predetermined synchronization pulse sequences to derive a second plurality of synchronization pulses.

In a third implementation of such apparatus, the master transceiver circuitry may be configured to, when sending the first plurality of synchronization pulse units from the master node, separate each synchronization pulse unit in the first plurality of synchronization pulse units from each temporally adjacent synchronization pulse unit in the first plurality of synchronization pulse units by a first temporal separation interval, and the slave transceiver circuitry is configured to, when sending the second plurality of synchronization pulse units from the slave node, separate each synchronization pulse unit in the second plurality of synchronization pulse units from each temporally adjacent synchronization pulse unit in the second plurality of synchronization pulse units by a second temporal separation interval different from the first temporal separation interval.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
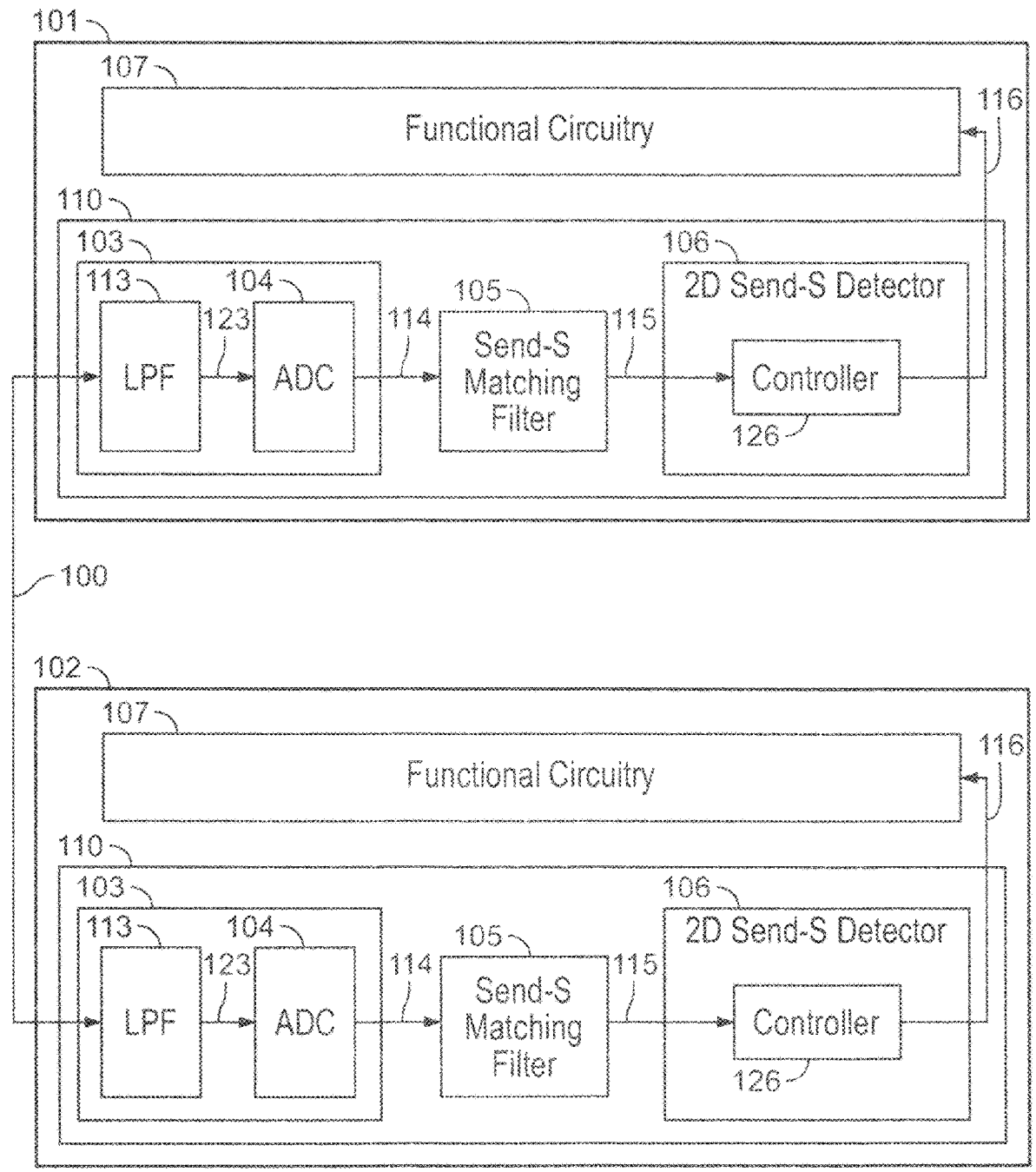
FIG. 1 shows an Ethernet connection, between a master node and a slave node, including circuitry implementing of the subject matter of this disclosure.

As noted above, in noisy environments, it may be difficult for a master node to detect a send-S signal from a slave node, for establishing an Ethernet connection, which could slow down the establishment of the connection. In environments where near-instantaneous response to user inputs is expected, and required for safety reasons, such as automotive applications in which a vehicle must respond immediately to driver inputs, delay in establishing a connection is unacceptable.

In accordance with implementations of the subject matter of this disclosure, a slave node in a high-speed Ethernet application, such as a 1000Base-T1 automotive gigabit application, continues to send send-S signals, in the form of three PRBSs separated by a predetermined interval, interspersed by a longer quiet period, until the master node detects the slave node-S signal and a connection is established.

Both the master node and the slave node transmit send-S signal sequences as described above, and each one of the master node and the slave node may use detection according to the subject matter of this disclosure to detect send-S signals from the other one of the master node and the slave node. As described above, the send-S signal follows a pattern of three repeatable sequences, spread over 1.02 µs, followed by a 4 µs quiet period. However, if both the master node and the slave node use the same pattern, the patterns may interfere with one another. Therefore, in accordance with another implementation of the subject matter of this disclosure, if the slave node sends multiple send-S patterns to the master node, the slave node send-S signal pattern may include a quiet period having a different duration than the quiet period of the master node send-S signal.

The send-S detector according to some implementations includes a matching filter having a correlation function that results in a peak during the PRBS, having an amplitude substantially greater than the surrounding signals. The peak usually occurs at the end of the PRBS when correlation is complete, and in any event, with three identical PRBSs, the peak would be expected to occur at the same point with the PRBS.

In previously known implementations, the send-S detector would wait until three peaks of the output of the matching filter, at the aforementioned greater amplitude, were detected. However, in a noisy high-speed environment, such as an automotive environment, the peak amplitude may be diminished, meaning that the detection threshold has to be lowered. At the same time, there may be noise peaks whose amplitudes approach and even exceed the lowered detection threshold. Therefore, false peak detections may occur, leading the detector to erroneously indicate that three peaks were detected. Such false-positive detections can result in synchronization failures and therefore slow the establishment of a connection.

Therefore, in accordance with implementations of the subject matter of this disclosure, a send-S detector tests for two different criteria, both of which must be satisfied before detection is indicated. This may be referred to as a "two-dimensional" detector. The two "dimensions" may be amplitude and temporal separation. That is, for detection to be indicated, at least two—and in most implementations three—peaks, each having an amplitude exceeding the detection threshold, must be detected, and each peak must be separated from the temporally adjacent detected peaks (i.e., the peaks before and after) by a predetermined duration. In other implementations, the amplitude dimension, or criterion, may be replaced by another criterion.

In systems operating according the IEEE 802.3 bp standard, the predetermined period would be 255 UI or 255×4/3 µs. Some tolerance—e.g., ±1 UI or ±2 UI or ±3 UI—may be permitted to account for channel conditions. The amount of tolerance may be programmable, or selectable, by a user. And in implementations under different standards, or not under any standard at all, even the base separation interval may be user-programmable or selectable to be other than 255 UI.

Thus, in most implementations, detection requires three peaks of sufficient amplitude, with the first and second peaks separated from each other by 255(±1 or ±2 or ±3) UI, and the second and third peaks also separated from each other by 255(±1 or ±2 or ±3) UI. However, in some implementations, particularly if the expected noise is such that some peaks might be missed, detection may require only two peaks separated by 255(±1 or ±2 or ±3) UI.

In still other implementations, a separation of a multiple of 255(±1 or ±2 or ±3) UI—e.g., twice 255(±1 or ±2 or ±3) UI—may be acceptable. In such an implementation, for example, the first and third peaks may be detected while the second peak is missed (i.e., is lower than the threshold) because of noise, but if the two peaks that are detected are not separated by 255(±1 or ±2 or ±3) UI, but instead are separated by twice 255(±1 or ±2 or ±3) UI—i.e., 510(±2 or ±4 or ±6) UI, then detection is indicated.

In a noisy environment that causes the detection threshold to be lowered and also gives rise to random additional signal peaks that may approach the lowered threshold, a mechanism may be needed to identify candidate peaks—i.e., peaks that may be send-S signals, but require verification of one or more additional peaks at the proper intervals. In accordance with implementations of the subject matter of this disclosure, candidate peaks may be identified using a peak search window having a temporal width smaller than the predetermined interval. By definition, two peaks are expected during the predetermined interval, but following a valid peak, there should not be a second peak sooner than the predetermined interval.

Therefore, on detection of an original peak meeting the amplitude threshold, a peak search window having a temporal width smaller than the predetermined interval is opened, and if an additional peak meeting the amplitude threshold is detected in the peak search window, then one of the two peaks is not valid. It may not be possible to determine with certainty which of the two peaks is not valid. One approach may be to discard any additional peak that is found in the peak search window after the original peak that is found in that window. Another approach might be to keep the last peak—i.e., to discard every peak but one until the window closes, so that the last peak found before the window closes remains. However, in accordance with implementations of the subject matter of this disclosure, the maximum peak is retained. That means that on finding an additional peak in the peak search window, the previously retained peak is discarded if the additional peak has a larger amplitude, and the additional peak is retained. But if the additional peak has a smaller amplitude than the previously retained peak, the additional peak is discarded and the previously retained peak is still retained. Any of these approaches may sometimes result in discarding valid peaks (if a noise peak is particularly large). However, it has been observed that any additional time needed, to detect send-S because valid peaks may be discarded, is acceptable.

The search windows themselves may be established based on the detection of the first candidate peak to be detected when first beginning send-S detection. The search window duration has to be less than the predetermined interval. Thus, for a predetermined interval of 255±3 UI, the search window duration should be shorter than about 250 UI. In one implementation, the search window duration may be about 200 UI.

In one implementation, it may be desirable to keep each peak near the center of its respective search window. Therefore, the first search window, opened on detection of a first candidate peak, may set to half the duration of other subsequent search windows. Thus, for a search window duration of 250 UI, the first search window, opened on detection of a candidate for the first of the three peaks to be found, might have a duration of only 125 UI.

After either two or three valid peaks are found in different search windows in this way, the spacing between the peaks is measured and if the measured spacing is equal to the predetermined interval (including any selected tolerance), then the send-S signal is considered to have been found. Otherwise, in some implementations the process begins again. However, in one implementation, instead of beginning again, the first of the three (or two) peaks is discarded and a further peak is detected resulting in a new set of three (or two) peaks. The spacing between the peaks in the new set of peaks is measured and if the measured spacing is equal to the predetermined interval (including any selected tolerance), then the send-S signal is considered to have been found. Otherwise, again the peak designated as "first" (what had been the second peak in the previous iteration) is discarded and a new peak detected, and then the peak separation is measured. The discarding of the "first" peak and the acquisition of a new peak is repeated until the measured peak separation is within the desired range.

In alternative implementations in which additional memory and processing capability are available, instead of discarding all but one of the peaks found in the search window, each peak found in the first search window can be considered a respective candidate first peak, and the received signal can be examined at the predetermined interval following each respective candidate peak for the occurrence of another candidate peak. If, starting with any respective candidate first peak, three (or in some cases two) peaks in a row separated from each other by the predetermined interval are detected, then the send-S signal can be considered to have been found.

The subject matter of this disclosure may be better understood by reference to FIGS. 1-4.

As shown in FIG. 1, an Ethernet connection 100 may exist between a master node 101 and a slave node 102. Each respective one of the master node 101 and the slave node 102 includes transceiver circuitry 110, having a respective analog front end 103 including a low-pass filter 113, and an analog-to-digital converter 104 receiving the output 123 of low-pass filter 113. A send-S matching filter 105, during training, monitors digitized signal 114 to find send-S signals, producing output 115 that is shown in more detail in FIGS. 2 and 3. Output 115 is applied to two-dimensional (2D) send-S detector 106. The output 116 of send-S detector 106 is passed on to functional circuitry 107 to perform whatever function is to be performed by master node 101 or slave node 102 in the system of which they and Ethernet connection 100 are a part.

Figure 2:
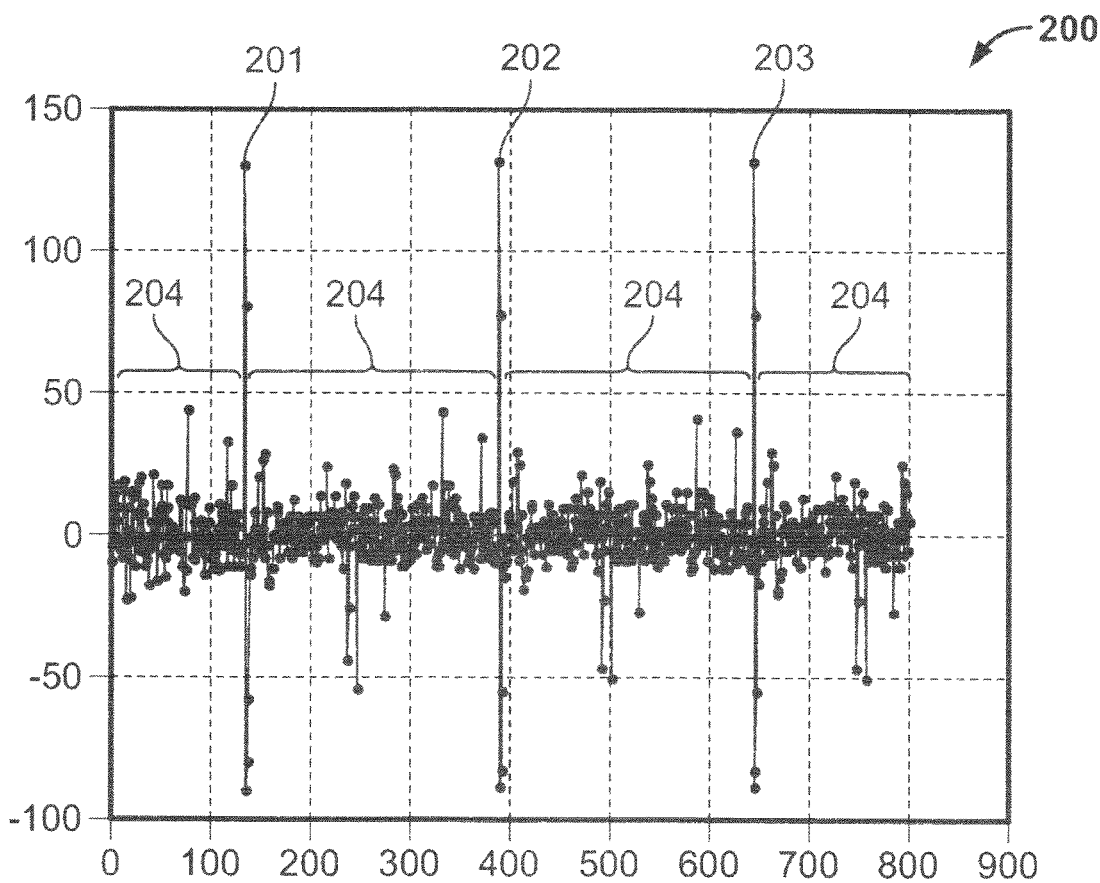
FIG. 2 shows an example of output of the matching filter in FIG. 1 in a low-noise environment.
Figure 3:
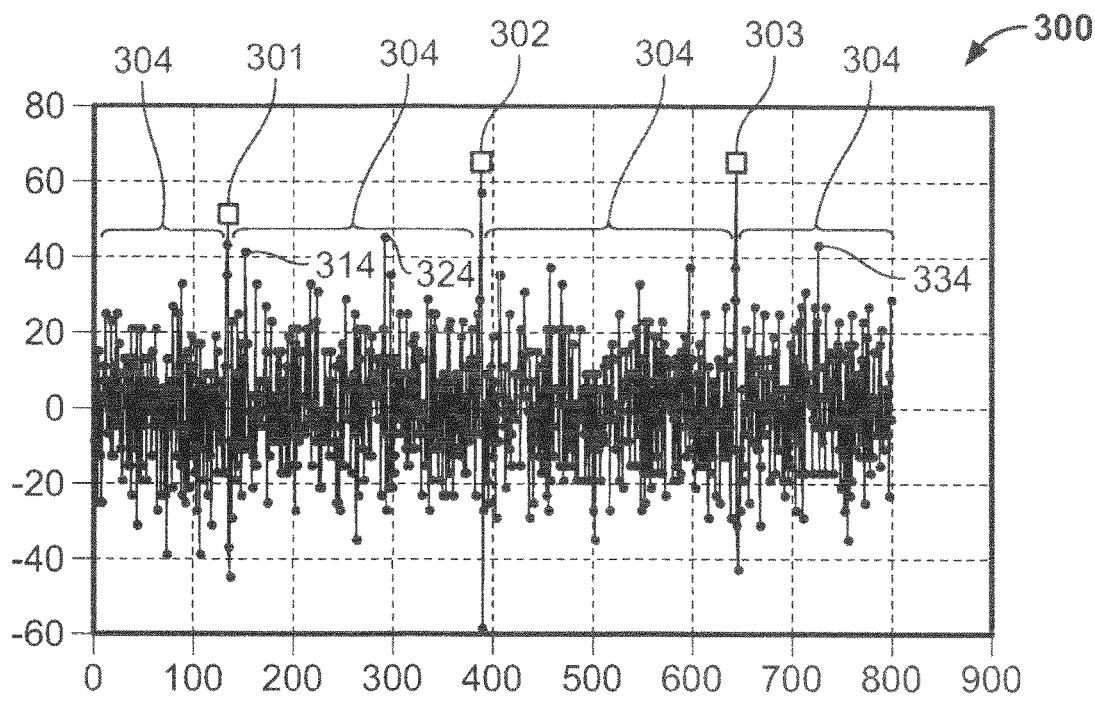
FIG. 3 shows an example of output of the matching filter in FIG. 1 in a noisy environment.

In FIGS. 2 and 3, the abscissa represents time marked off in unit intervals, while the ordinate represents amplitude represented as correlated relative values. As seen in FIG. 2, in a low-noise environment, output 200 of send-S matching filter 105 has well-defined signal peaks 201, 202, 203 along with relatively smaller noise peaks 204. On the other hand, in output 300 of send-S matching filter 105 in a noisy environment, as shown in FIG. 3, signal peaks 301, 302, 303 have lower amplitudes than signal peaks 201, 202, 203, while noise peaks 304 have substantially higher amplitudes than noise peaks 204. Indeed, some noise peaks (e.g., peaks 314, 324 and 334) are close in amplitude to some of signal peaks 301, 302, 303. It can therefore be seen why it may be difficult to accomplish the goal of distinguishing the true signal peaks 301, 302, 303 from some of noise peaks 304.

Although the foregoing discussion of FIG. 3 focuses on the positive peaks, the negative peaks may be examined as well, because the polarity of the send-S signals from the slave node may differ from the polarity of the send-S signals of the master node. When examining the negative peaks, the absolute value of each negative peak may be compared to the aforementioned threshold, and those negative peaks whose absolute value exceed the threshold are considered as potential send-S signal peaks. Therefore, in this description and the claims that follow, discussion of a peak having an amplitude exceeding a threshold should be considered to include a negative peak whose having an amplitude whose absolute value exceeds the threshold.

In accordance with implementations of the subject matter of this disclosure, send-S detector 106 includes a controller 126 that performs a method such as that described above and/or shown in FIG. 4 to identify true signal peaks 301, 302, 303 by detecting two "dimensions"—i.e., two different characteristics of the signal peaks.

Figure 4A:
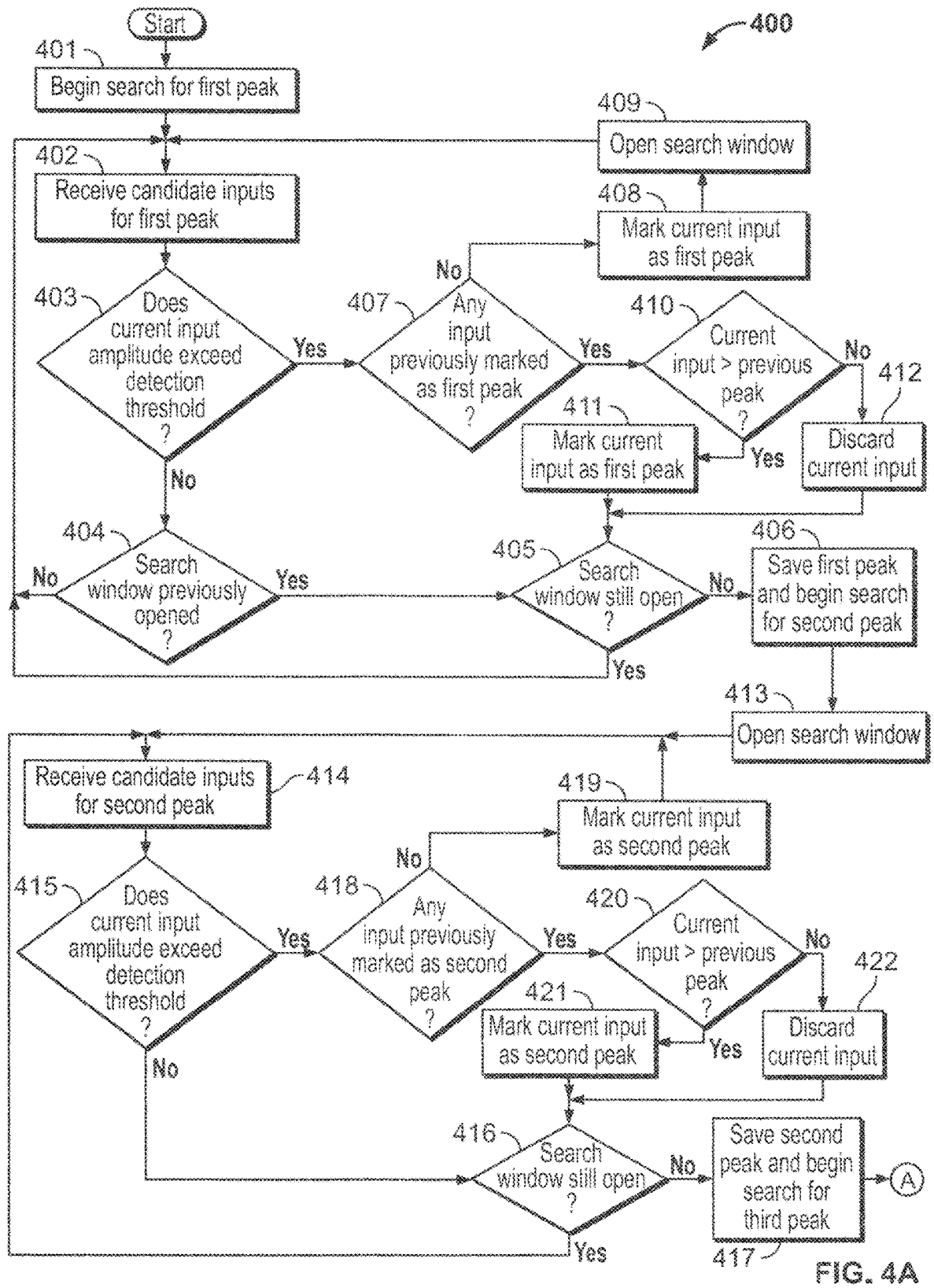
FIGS. 4A and 4B, hereinafter referred to collectively as FIG. 4, is a flow diagram of a method according to implementations of the subject matter of this disclosure which may be implemented by the circuitry of FIG. 1.
Figure 4B:
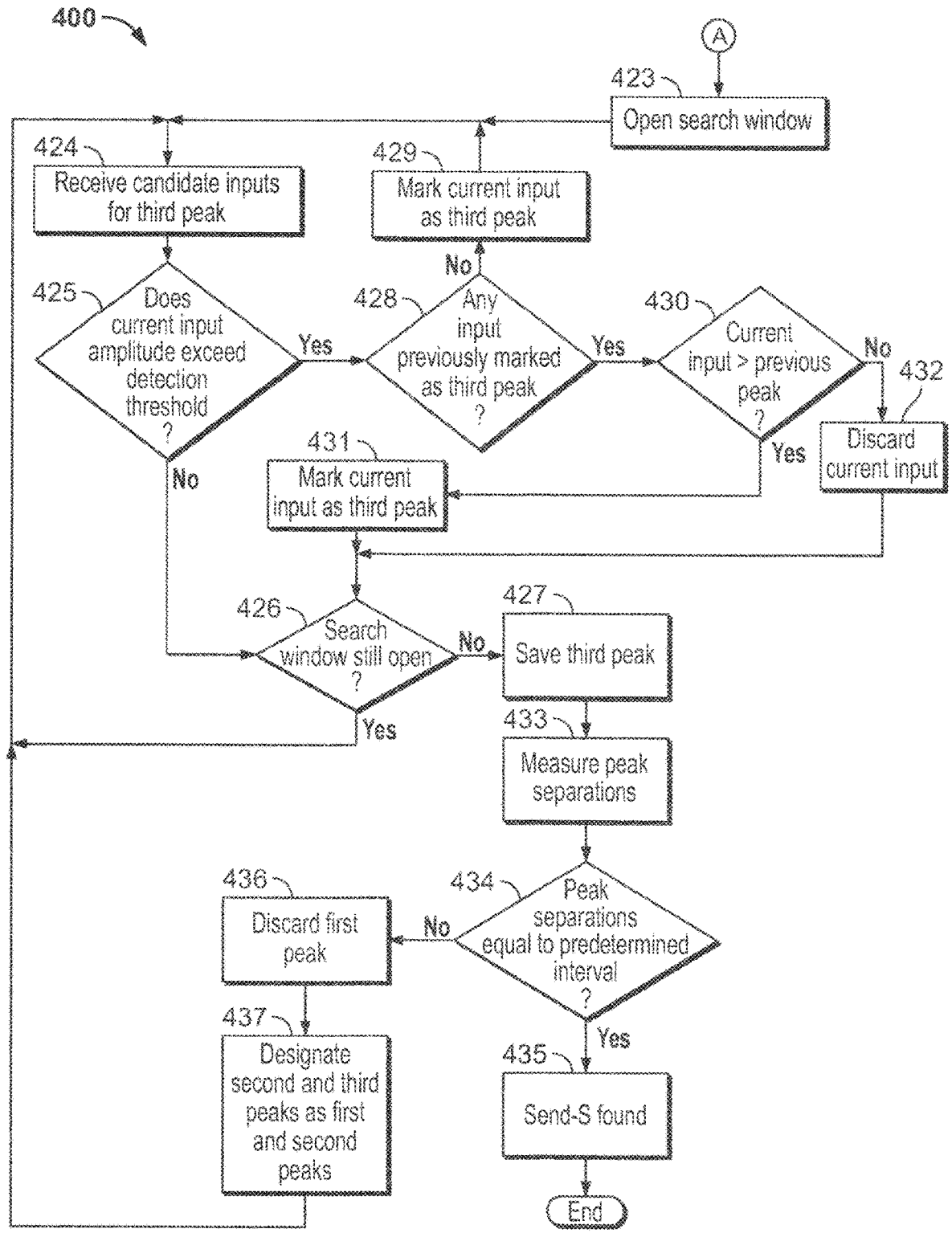

A method 400 according to implementations of the subject matter of this disclosure is diagrammed in FIG. 4. Method 400 is substantially the same whether carried out at master node 101 or slave node 102.

Method 400 begins at 401 where the search for the first of three peaks begins. At 402, candidate inputs for the first peak are received, and at 403 it is determined whether the amplitude of the input signal exceeds the detection threshold, which would indicate a candidate peak. If not, then at 404 it is determined whether a search window has previously been opened (i.e., whether or not any previous input has had a high enough amplitude to be considered a peak). If at 404 a search window has not previously been opened, flow returns to 402 to receive additional inputs. If at 404 a search window has previously been opened, then at 405 it is determined whether the search window is still open (or is closed because the current input was received at the end of the window). If at 405 the search window is still open, flow returns to 402 to receive additional inputs. If at 405 the search window is not still open, that means the end of the search window has been reached and a peak has previously been detected (or the window would not have been opened), then at 406 the peak that has been detected is saved as the first peak and flow progresses to 413 to begin the search for the second peak.

If at 403 the amplitude of the input signal exceeds the detection threshold, which would indicate a candidate peak, then at 407 it is determined whether any input has previously been marked (provisionally) as the first peak. If not, then at 408 the current input is marked as the first peak and at 409, because this is the first time a potential peak has been detected, the search window is opened and flow returns to 402 to search for additional candidate peaks in the current search window. As previously described, this first search window is set, in this implementation, to half the predetermined interval.

If at 407 it is determined that an input has previously been marked (provisionally) as the first peak, then at 410 it is determined whether the current input has a greater amplitude than the previously marked peak. If so, then at 411 the current input is (provisionally) marked as the first peak and flow continues to 405 and proceeds as described above. If at 410 it is determined that the current input does not have a greater amplitude than the previously marked peak, then at 412 the current input is discarded and flow continues to 405 and proceeds as described above.

As noted above, at 413 the search for the second peak begins, with the opening of a second search window, having a width equal to the predetermined interval. Flow then proceeds to 414 to receive candidate inputs for the second peak. At 415 it is determined whether the amplitude of the input signal exceeds the detection threshold, which would indicate a candidate peak. If not, then at 416 it is determined whether the search window is still open (or is closed because the current input was received at the end of the window). If at 416 the search window is still open, flow returns to 414 to receive additional inputs. If at 416 the search window is not still open, that means the end of the search window has been reached and at 417 whatever peak has been detected is saved as the second peak and flow progresses to 423 to begin the search for the third peak.

If at 415 the amplitude of the input signal exceeds the detection threshold, which would indicate a candidate peak, then at 418 it is determined whether any input has previously been marked (provisionally) as the second peak. If not, then at 419 the current input is marked as the second peak and flow returns to 414 to search for additional candidate peaks in the current search window.

If at 418 it is determined that an input has previously been marked (provisionally) as the second peak, then at 420 it is determined whether the current input has a greater amplitude than the previously marked peak. If so, then at 421 the current input is (provisionally) marked as the second peak and flow continues to 416 and proceeds as described above. If at 420 it is determined that the current input does not have a greater amplitude than the previously marked peak, then at 422 the current input is discarded and flow continues to 416 and proceeds as described above.

As noted above, at 423 the search for the third peak begins, with the opening of a third search window, having a width equal to the predetermined interval. Flow then proceeds to 424 to receive candidate inputs for the third peak. At 425 it is determined whether the amplitude of the input signal exceeds the detection threshold, which would indicate a candidate peak. If not, then at 426 it is determined whether the search window is still open (or is closed because the current input was received at the end of the window). If at 426 the search window is still open, flow returns to 424 to receive additional inputs. If at 426 the search window is not still open, that means the end of the search window has been reached and at 427 whatever peak has been detected is saved as the third peak and flow progresses to 433 as described below.

If at 425 the amplitude of the input signal exceeds the detection threshold, which would indicate a candidate peak, then at 428 it is determined whether any input has previously been marked (provisionally) as the third peak. If not, then at 429 the current input is marked as the third peak and flow returns to 424 to search for additional candidate peaks in the current search window.

If at 428 it is determined that an input has previously been marked (provisionally) as the third peak, then at 430 it is determined whether the current input has a greater amplitude than the previously marked peak. If so, then at 431 the current input is (provisionally) marked as the third peak and flow continues to 426 and proceeds as described above. If at 430 it is determined that the current input does not have a greater amplitude than the previously marked peak, then at 432 the current input is discarded and flow continues to 426 and proceeds as described above.

At 433, the separations between the peaks are measured. At 434, it is determined whether the peak separations are equal to the predetermined interval (including any tolerances that may have been set). If so, then at 435, send-S is considered to have been found and method 400 ends. If at 434 it is determined that the peak separations are not equal to the predetermined interval, then send-S detection has failed and at 436 the first peak is discarded. At 437 the second and third peaks are designated as the new first and second peaks, and flow returns to 424 to receive candidate inputs for a new third peak, and flow continues as above until send-S is found.

Thus it is seen that a method and apparatus for reliable detection of synchronization signals on a high-speed Ethernet connection in a noisy environment has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of synchronizing a master node and a slave node on a high-speed Ethernet connection, the method comprising:
sending a first plurality of synchronization pulse units from the master node on the high-speed Ethernet connection;
receiving at the master node a second plurality of synchronization pulse units that are sent by the slave node on the high-speed Ethernet connection in response to receipt at the slave node of at least one synchronization pulse unit from the first plurality of synchronization pulse units;

monitoring at the master node for receipt of a first synchronization pulse unit, from the second plurality of synchronization pulse units, having a predetermined characteristic;

monitoring at the master node for receipt of at least one further synchronization pulse unit, from the second plurality of synchronization pulse units, having the predetermined characteristic; and recognizing receipt of the second plurality of synchronization pulse units upon receipt of the first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition.

2. The method of claim 1 wherein:

the monitoring at the master node for receipt of the first synchronization pulse unit, from the second plurality of synchronization pulse units, having the predetermined characteristic comprises monitoring at the master node for receipt of the first synchronization pulse unit, from the second plurality of synchronization pulse units, having a first amplitude above a predetermined threshold;

the monitoring at the master node for receipt of the at least one further synchronization pulse unit, from the second plurality of synchronization pulse units, having the predetermined characteristic comprises monitoring at the master node for receipt of the at least one further synchronization pulse unit, from the second plurality of synchronization pulse units, having a second amplitude above the predetermined threshold; and the recognizing receipt of the second plurality of synchronization pulse units upon receipt of first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition comprises recognizing receipt of the second plurality of synchronization pulse units when each of the first synchronization pulse unit and the at least one further synchronization pulse unit is separated in time from a temporally adjacent one of the first synchronization pulse unit and the at least one further synchronization pulse unit by a first predetermined time interval.

3. The method of claim 2 wherein:

the recognizing receipt of the second plurality of synchronization pulse units upon receipt of first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition further comprises also recognizing receipt of the second plurality of synchronization pulse units when, on failure of one of the at least one further synchronization pulse unit to be recognized at the first predetermined time interval, another one of the at least one further synchronization pulse unit is detected at a multiple of the first predetermined time interval from the first synchronization pulse unit.

4. The method of claim 2 further comprising selecting the predetermined threshold in advance.

5. The method of claim 2 further comprising selecting the first predetermined time interval in advance.

6. The method of claim 2 further comprising setting a temporal tolerance for the first predetermined time interval.

7. The method of claim 2 wherein the recognizing comprises:

monitoring during a second predetermined time interval, shorter than the first predetermined time interval, for occurrence of at least one candidate synchronization pulse unit; and on expiration of the second predetermined time interval declaring one of the at least one candidate synchronization pulse unit having a maximum amplitude to be the first synchronization pulse unit.

8. The method of claim 2 wherein the recognizing comprises:

monitoring for occurrence of candidate synchronization pulse units; and for each respective candidate synchronization pulse unit detected, monitoring for occurrence of the further synchronization pulse unit at a respective elapsing of the first predetermined time interval following the respective candidate synchronization pulse unit.

9. The method of claim 1 wherein:

the sending a first plurality of synchronization pulse units comprises sending a first plurality of predetermined synchronization pulse sequences; and the sending a second plurality of synchronization pulse units comprises sending a second plurality of predetermined synchronization pulse sequences; the method further comprising:

filtering the first plurality of predetermined synchronization pulse sequences to derive a first plurality of synchronization pulses; and filtering the second plurality of predetermined synchronization pulse sequences to derive a second plurality of synchronization pulses.

10. The method of claim 1, wherein:

the sending a first plurality of synchronization pulse units from the master node comprises separating each synchronization pulse unit in the first plurality of synchronization pulse units from each temporally adjacent synchronization pulse unit in the first plurality of synchronization pulse units by a first temporal separation interval; and the receiving at the master node a second plurality of synchronization pulse units that are sent by the slave node on the high-speed Ethernet connection in response to receipt at the slave node of at least one synchronization pulse unit from the first plurality of synchronization pulse units comprises receiving the second plurality of synchronization pulse units wherein each synchronization pulse unit in the second plurality of synchronization pulse units is separated from each temporally adjacent synchronization pulse unit in the second plurality of synchronization pulse units by a second temporal separation interval different from the first temporal separation interval.

11. Apparatus for synchronizing a master node and a slave node on a high-speed Ethernet connection, the apparatus comprising:
master transceiver circuitry configured to:
send a first plurality of synchronization pulse units from the master node, and
receive a second plurality of synchronization pulse units that are sent by slave transceiver circuitry in the slave node in response to receipt at the slave node of at least one synchronization pulse unit from the first plurality of synchronization pulse units;
monitoring circuitry at the master node configured to monitor for receipt of a first synchronization pulse unit, from the second plurality of synchronization pulse units, having a predetermined characteristic, and to monitor for receipt of at least one further synchronization pulse unit, from the second plurality of synchronization pulse units, having the predetermined characteristic; and
controller circuitry configured to recognize receipt of the second plurality of synchronization pulse units upon receipt of first synchronization pulse unit having the predetermined characteristic and receipt of the at least one further synchronization pulse unit having the predetermined characteristic, and the first synchronization pulse unit and the at least one further synchronization pulse unit meet one of (a) a first temporal spacing condition or (b) a second temporal spacing condition that is an integer multiple of the first temporal spacing condition.

12. The apparatus of claim 11, wherein:
the monitoring circuitry is configured to monitor for receipt of the first synchronization pulse unit, from the second plurality of synchronization pulse units by monitoring for a first amplitude above a predetermined threshold;
the monitoring circuitry is configured to monitor for receipt of the at least one further synchronization pulse unit, from the second plurality of synchronization pulse units by monitoring for a second amplitude above the predetermined threshold; and
the controller circuitry is configured to recognize receipt of the second plurality of synchronization pulse units when each of the first synchronization pulse unit and the at least one further synchronization pulse unit is separated in time from a temporally adjacent one of the first synchronization pulse unit and the at least one further synchronization pulse unit by a first predetermined time interval.

13. The apparatus of claim 12 wherein:
the controller circuitry is configured to also recognize receipt of the second plurality of synchronization pulse units when, on failure to recognize one of the at least one further synchronization pulse unit at the first predetermined time interval, another one of the at least one further synchronization pulse unit is detected at a multiple of the first predetermined time interval from the first synchronization pulse unit.

14. The apparatus of claim 12 wherein the monitoring circuitry is configurable to select the predetermined threshold.

15. The apparatus of claim 12 wherein the controller circuitry is configurable to select the first predetermined time interval.

16. The apparatus of claim 12 wherein the controller circuitry is configurable to select a temporal tolerance for the first predetermined time interval.

17. The apparatus of claim 12 wherein the controller circuitry is configured to:
on detecting a first candidate synchronization pulse unit, monitor during a second predetermined time interval, shorter than the first predetermined time interval, for occurrence of a second candidate synchronization pulse unit;
on expiration of the second predetermined time interval, declare one of the at least one candidate synchronization pulse unit having a maximum amplitude to be the first synchronization pulse unit.

18. The apparatus of claim 12 wherein the controller circuitry is configured to:
monitor for occurrence of candidate synchronization pulse units; and
for each respective candidate synchronization pulse unit detected, monitor for occurrence of the further synchronization pulse unit at a respective elapsing of the first predetermined time interval following the respective candidate synchronization pulse unit.

19. The apparatus of claim 11 wherein:
the master transceiver circuitry is configured to send a first plurality of synchronization pulse sequences as the first plurality of synchronization pulse units;
the slave transceiver circuitry is configured to send a second plurality of synchronization pulse sequences as the second plurality of predetermined synchronization pulse units; and
the master transceiver circuitry further comprises a filter configured to:
filter the first plurality of predetermined synchronization pulse sequences to derive a first plurality of synchronization pulses; and
filter the second plurality of predetermined synchronization pulse sequences to derive a second plurality of synchronization pulses.

20. The apparatus of claim 11, wherein:
the master transceiver circuitry is configured to, when sending the first plurality of synchronization pulse units from the master node, separate each synchronization pulse unit in the first plurality of synchronization pulse units from each temporally adjacent synchronization pulse unit in the first plurality of synchronization pulse units by a first temporal separation interval; and
the slave transceiver circuitry is configured to, when sending the second plurality of synchronization pulse units from the slave node, separate each synchronization pulse unit in the second plurality of synchronization pulse units from each temporally adjacent synchronization pulse unit in the second plurality of synchronization pulse units by a second temporal separation interval different from the first temporal separation interval.

* * * * *